Figure 1:
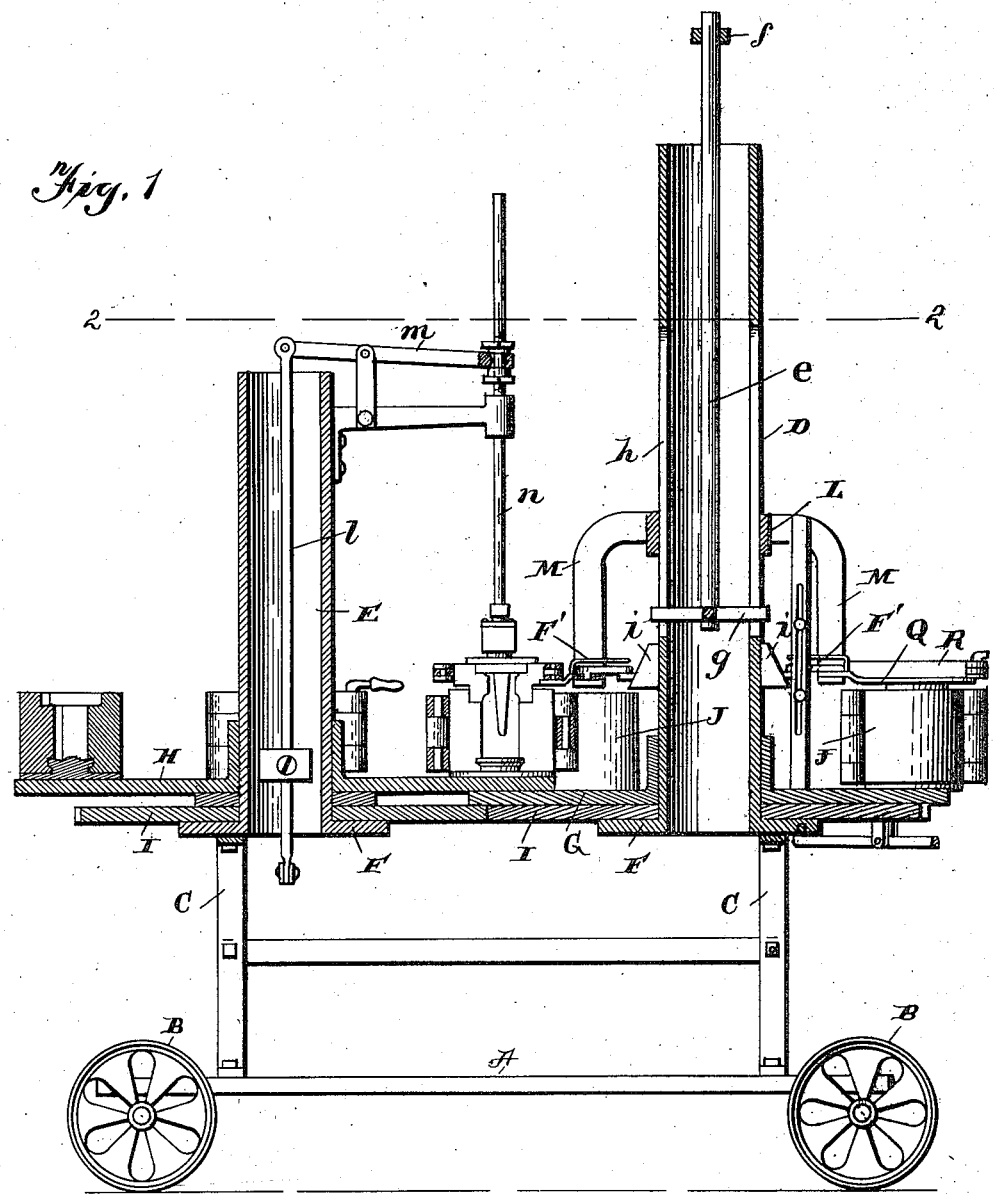

No. 617,950. Patented Jan. 17, 1899.
C. E. BLUE.
MACHINE FOR MANUFACTURING GLASSWARE.
(Application filed May 6, 1898.)

(No Model.) 5 Sheets—Sheet 1.

Witnesses
Geo. E. Fuchs
B. E. Seitz

Inventor
C. E. Blue,
by A. S. Pattison
Attorney

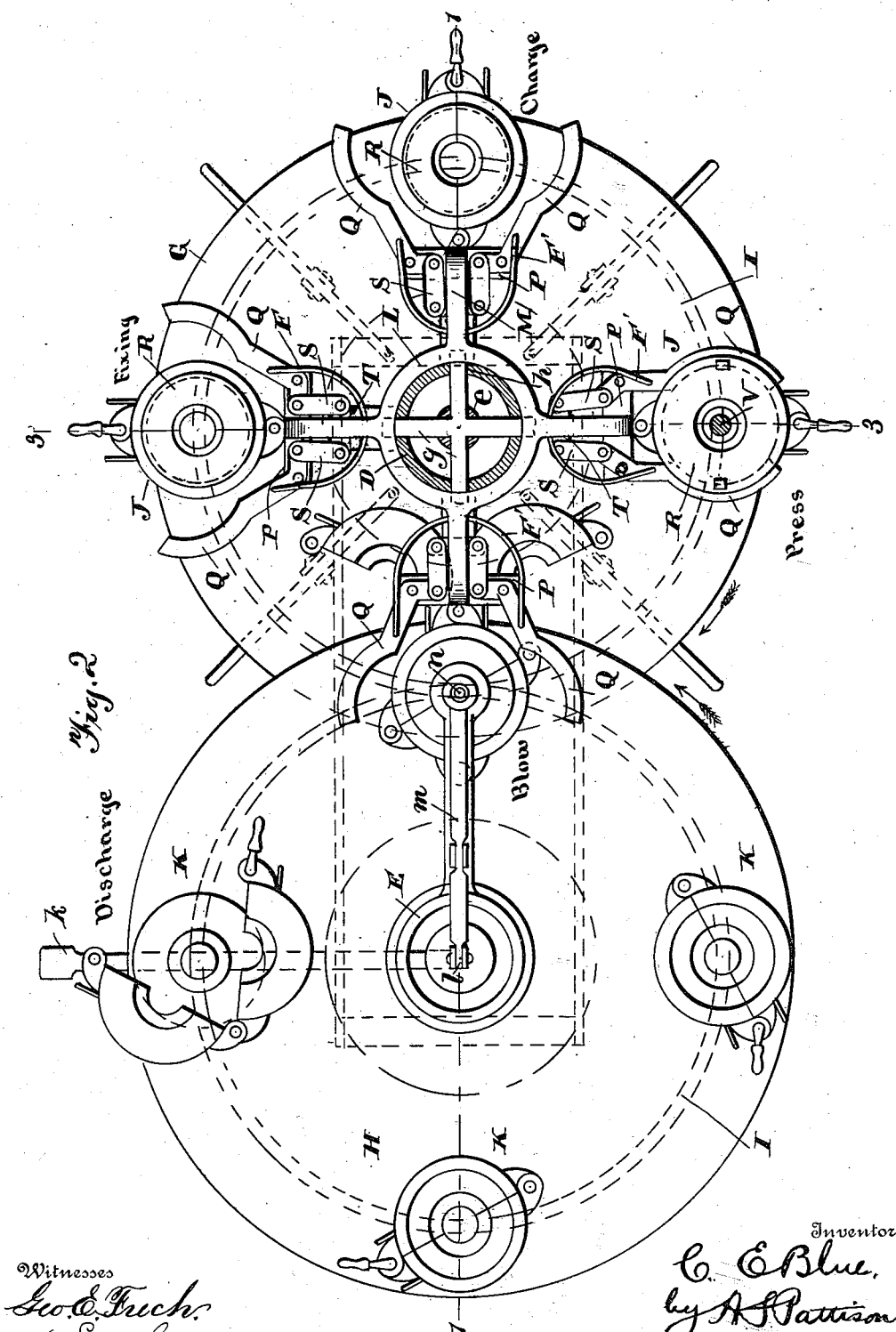

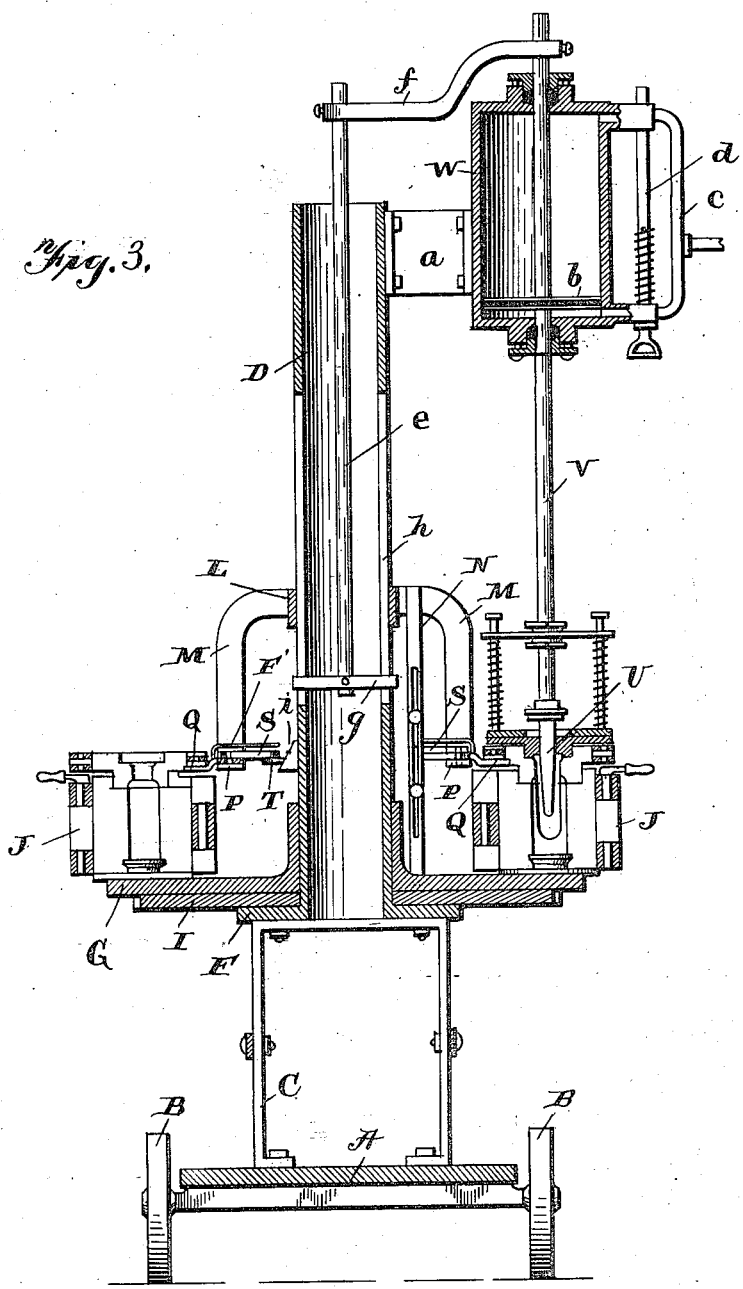

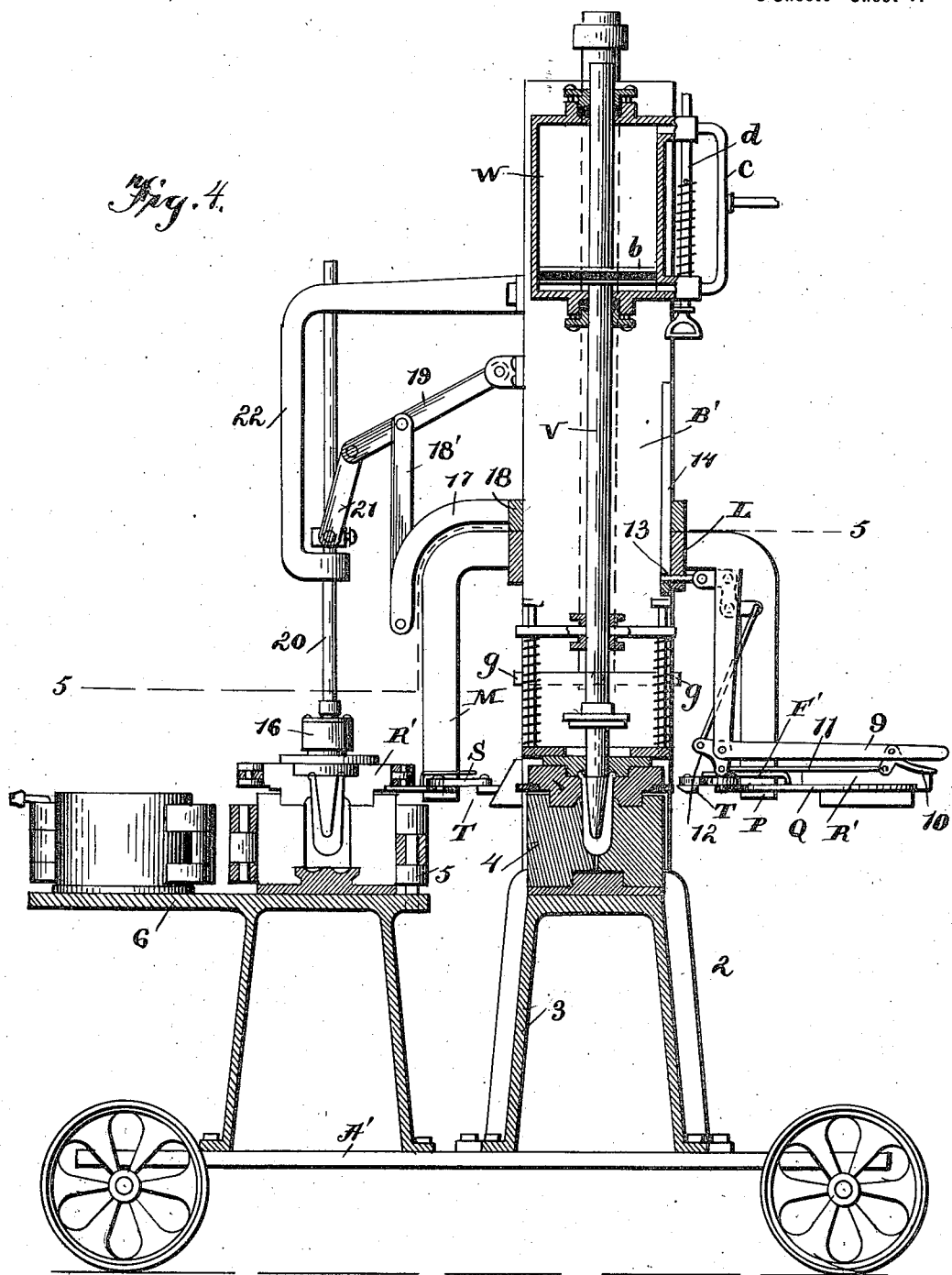

No. 617,950. Patented Jan. 17, 1899.
C. E. BLUE.
MACHINE FOR MANUFACTURING GLASSWARE.
(Application filed May 6, 1898.)
(No Model.) 5 Sheets—Sheet 5.
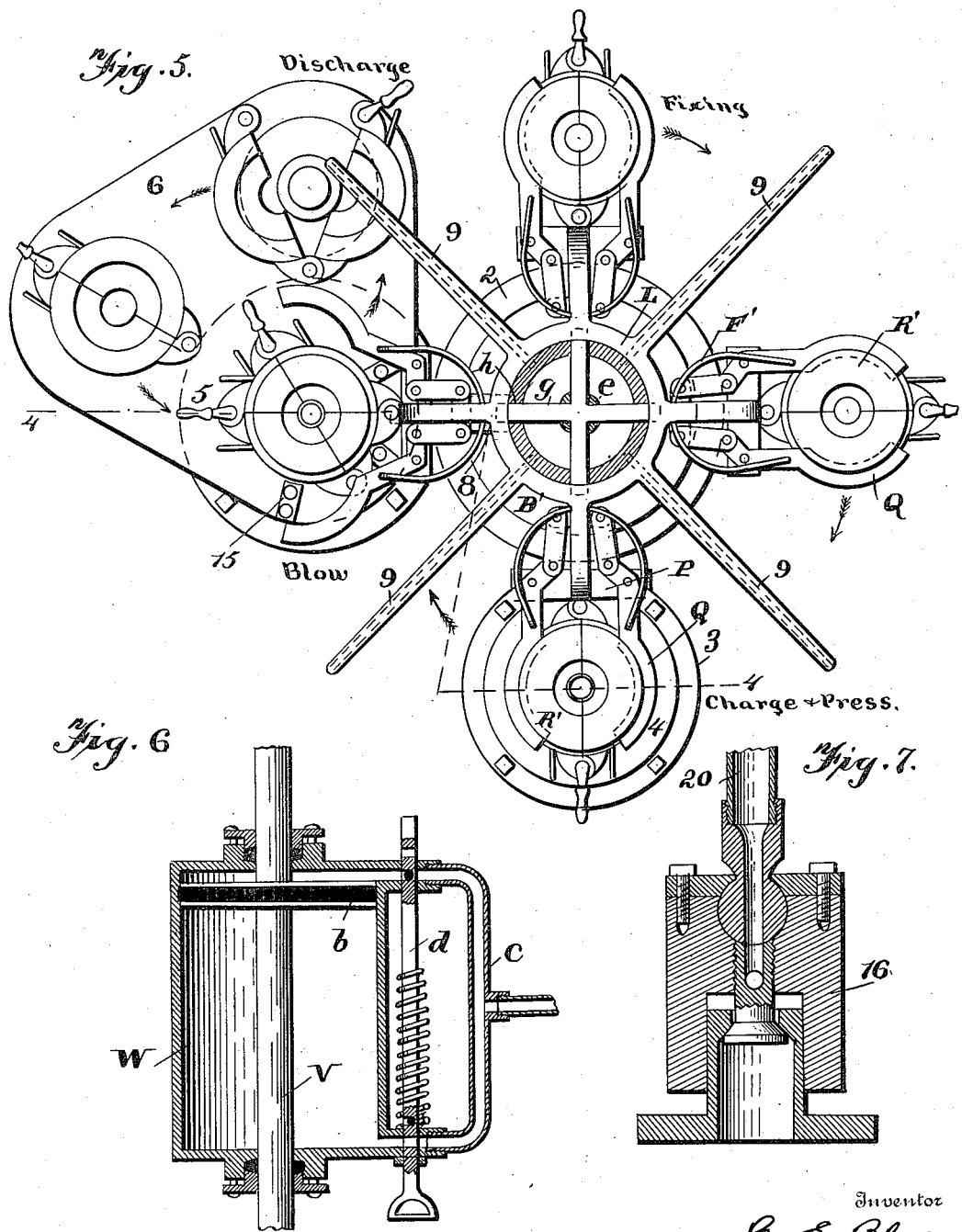
Witnesses
Geo. E. Fuch.
B. E. Seitz
Inventor
C. E. Blue,
by A. S. Pattison,
Attorney

UNITED STATES PATENT OFFICE.

CHARLES EDWIN BLUE, OF WHEELING, WEST VIRGINIA.

MACHINE FOR MANUFACTURING GLASSWARE.

SPECIFICATION forming part of Letters Patent No. 617,950, dated January 17, 1899.

Application filed May 6, 1898. Serial No. 679,915. (No model.)

*To all whom it may concern:*

Be it known that I, CHARLES EDWIN BLUE, a citizen of the United States, residing at Wheeling, in the county of Ohio and State of West Virginia, have invented new and useful Improvements in Machines for the Manufacture of Glassware, of which the following is a specification.

My invention relates to improvements in machines for the manufacture of glassware, and pertains to that class of machines in which the glass is pressed and blown to its completed form.

The primary object of my invention is to provide a machine comprising a press and a blow mold and a vertically-movable carrier for removing the pressed glass from the press-mold and depositing it in the blow-mold.

Another object of my invention is to construct a machine having a press mold or molds and a blow mold or molds and a plurality of neck-ring supports adapted to automatically engage and release the neck-ring supports and to withdraw the pressed glass (through the medium of the neck-rings) from the press-mold and deposit it in the blow-mold.

Another object of my present invention is the providing of a machine with a plurality of independent press-molds and a plurality of independent blow-molds, each having independent supports, and a plurality of neck-ring carriers adapted to have a vertical and a lateral movement for withdrawing the pressed glass from the press-mold, moving it laterally, and depositing it within the blow-mold.

Another object of my present invention is the providing of a machine comprising independent press and blow molds, a vertically-movable neck-ring support adapted to withdraw the pressed article and deposit it in the blow-mold, and a vertically-movable blow-head operated by the movement of the ring-supports, whereby the blow-head is seated on the blow-mold when the pressed glass is deposited therein.

My invention consists in the construction and arrangement of parts, which will be fully described hereinafter, and in which—

Figure 1 is a vertical section taken on the line 1 1 of Fig. 2. Fig. 2 is a horizontal sectional plan upon the line 2 2 of Fig. 1. Fig. 3 is a vertical sectional view taken on the line 3 3 of Fig. 2. Fig. 4 is a vertical sectional view taken on the line 4 4 of Fig. 5. Fig. 5 is a horizontal sectional plan taken on the line 5 5 of Fig. 4. Fig. 6 is an enlarged sectional view of the plunger-actuating cylinder and its controlling-valve. Fig. 7 is an enlarged sectional view of the automatically-acting blow-head.

A represents a base, preferably mounted upon wheels B, and supported upon this base upon standards C or in any desired manner are the columns D and E. These columns are each provided with laterally-projecting flanges F at their lower ends, and surrounding the columns and supported by the said flanges are the revoluble tables G and H. The table G, I designate a "press-mold" table and the table H a "blow-mold" table. These tables, as here shown, are provided with intermeshing gears I, which may be separate from and secured to the table, as here shown, or the gear-teeth formed integral with the table, as may be desired. Owing to this arrangement the tables revolve in unison, as will be readily understood, and this unity of revolution can be accomplished through the medium of an intermediate gear, if desired, whereby the blow-mold table H would revolve in the opposite direction from that indicated by arrow in Fig. 2, as is well understood by mechanics.

The press-mold table G is provided with a plurality of press-molds J, which are preferably composed of vertical sections and of the usual well-known construction, the sections being pivoted together, so that they may be swung open for the purpose of removing the pressed article therefrom. The blow-mold table H is also provided with a plurality of blow-molds, also consisting of vertical sections hinged together and preferably of the well-known form. These two tables being geared together and revolving uniformly and one overlapping the other, as illustrated in Fig. 1, it will be readily understood that the blow-mold of the blow-table and the press-mold of the press-table travel in a common intersecting path or point, as indicated in Fig. 2.

Vertically and revolubly movable upon the column or standard D of the press-mold table is a ring or collar L, provided with a plurality of arms M, of a number preferably corresponding to the number of the press-mold, and these arms are connected with the table G through the medium of a telescopic or longitudinally-slidable connection N, whereby the collar L and its arms are revolved by and with the table G. These arms, as here shown, are preferably curved downward, and the extremities of the arms are provided with a cross-head P. Intermediately pivoted to the ends of this cross-head are the arms Q, having their outer ends curved and adapted to engage the neck-rings R, which coöperate with the press and the blow molds, as is well understood by those skilled in the art. Pivoted to the inner free ends of these arms, levers, or jaws Q are the links S, the opposite and inner ends of the links being connected by a cross link or block T. These jaws or arms or levers Q are normally held open, as illustrated, at the charging, blowing, and fixing positions, as illustrated in Fig. 2.

The machine is provided with the usual plunger U for pressing the glass in the press-mold, the said plunger being actuated through the plunger-rod V, which has its upper end passing through a cylinder W, the said cylinder being supported by the upper end of the column D through the medium of a bracket a. The said plunger-rod V is provided with a piston-head b within the cylinder, and the piston-head is actuated through the medium of fluid-pressure, which is admitted to opposite ends of the cylinder through the pipes c. The admission of the fluid-pressure is regulated through the medium of a valve-rod d, (clearly illustrated in Fig. 6,) whereby the operator is enabled to reciprocate the plunger through the movement of the valve-rod d, thus admitting air or fluid pressure to either end of the cylinder. This construction and operation is well understood and need not be here more fully described.

A rod e extends longitudinally within the column D and has its upper end connected with the upper projecting end of the plunger-rod V through the medium of a connecting bracket or arm f, whereby the said rod e is moved in unison up and down with the plunger-rod V. The lower end of this plunger-rod V is provided with laterally-projecting arms or pins g, which project through longitudinal openings or slots h within the column and are adapted when the rod V is moved upward through the upward movement of the plunger U to engage the under side of the collar L, thus lifting the collar L and its arms or jaws Q, which carry the neck-ring, from the pressing-point to the blowing-point, as will be presently more fully described.

Projecting laterally from the column D near its lower end are the cam-studs i, which are adapted to engage the cross links or blocks T, connecting the inner ends of the links S, when the collar L and its arms are lowered, whereby the jaws or arms Q are separated against the tension of the springs F'. There are three of these cam-studs i, one being situated at the blow-point, one at the fixing-point, and one at the charging-point, none being provided at the pressing-point. From this it will be noted that upon the lowering of the collar L and its arms when the plunger is carried down within the press-mold for pressing the charged glass therein the arms Q are forced apart at the blowing, fixing, and charging points, while they remain closed around the neck-ring R at the pressing-point. This prevents the neck-ring of the mold at the blowing, fixing, and pressing points from being elevated when the collar L is lifted through the medium of the lifting of the plunger, while it accomplishes the lifting of the neck-ring situated upon the mold which is at the pressing-point.

The press-table G is revolved through the medium of the handle j, which has its inner end adapted to engage an opening in the flange F of the column D just at the right of the pressing-point. The operator by lifting the outer end of the handle at the right of the pressing-point will disengage its inner end and can revolve the table to carry the mold which is at the pressing-point to the blowing-point and the mold which was at the blowing-point to the fixing-point, and so on throughout the revolution of the table, as is well understood. At the same time the table H is uniformly revolved, as before described, whereby the blow-molds are brought to the blowing-point and also to the discharging-point to have the article removed by the turning-out boy.

In operation the press-molds are charged at the charging-point and the table revolved, taking it to the pressing-point. At the pressing-point the neck-ring is engaged by the arms Q, as before described. When the plunger is removed, the table is revolved to carry the mold in which the glass was just pressed to the blowing-point, and the succeeding mold at the charging-point has been charged with molten glass. The removing of the plunger has elevated the ring L and its arms, and hence the neck-ring R, which is coöperating with the press-mold at the pressing-point, is elevated through the medium of the jaws or levers Q, which withdraws the pressed glass or blank from the pressing-mold and moves it upward. The parts of the press-mold are then opened outward, as shown at the blowing-point in Fig. 2, by the press operator, or they may be opened automatically to be out of the way of the blow-mold when they reach the blow-point. The table having been revolved to carry the pressed blank over the blowing-point, the movement of the plunger to press the glass in the succeeding press-mold will permit the downward movement of the ring L and its arms, and consequently the depositing of the pressed blank within the blow-mold. This movement has thrown the arms Q open, as illustrated, and disengaged them from the neck-ring, which is now deposited upon the blow-mold. The blowing is then effected through the pressure of the foot of the turning-out boy upon the treadle $k$, which is connected through the medium of a rod $l$ and a lever $m$ with the blow-head rod $n$, which carries the blow-head down upon the blow-mold. The blow-head is constructed to automatically admit and cut off air, as shown in Fig. 7, and as fully illustrated and described in my patent dated June 15, 1897, numbered 584,665, and need not therefore be more fully described here. Instead of operating the blow-head by an independent movement, however, as just described, this may be accomplished automatically through the movement of the ring $l$, as illustrated in Fig. 4 and which will be fully described hereinafter. From this description it will be seen that intermittent rotation of the press and blow mold tables and the movement of the plunger will cause the pressing and the blowing of the article at each movement, whereby a blank is pressed and a pressed blank is at the same time blown to the finished form. When the blow-mold reaches the discharging-point, the neck-ring is thrown open and the blow-mold also opens for removing the finished article therefrom. The turning-out boy will then place the neck-ring upon the mold at the fixing-point, ready to again receive a charge of glass at the charging-point.

In Figs. 4 and 5 I show a modification of the construction to the extent of omitting the press-table and substituting therefor a single stationary press-mold and omitting the blow-mold table and substituting therefor a stationary support for one or more blow-molds. In this instance I show a support 2 projecting from the base A', which forms the support for the column B'. In this construction the neck-ring R' and its arms and levers are the same as heretofore described and need not at this point again be specifically referred to. Also extending from the base A is a standard 3, which supports a press-mold 4. This press-mold is of the same construction as illustrated in Figs. 1 and 2, and coöperating with this press-mold and also to coöperate with the blow-mold 5 upon the stationary table or support 6 therefor are a plurality of neck-rings 7, which are also preferably of the same construction as illustrated in Figs. 1 and 2. In this modification it will be noted, and as illustrated, that the neck-rings are supported upon the arms or levers Q of the arms M and that only one cam-stud 8 is provided upon the column B', and this is at the blowing-point. The collar L in this instance is provided with a plurality of projecting arms 9, which form the means for rotating the collar L and its arms M, and these arms 9 are provided with a handle 10, connected through the medium of rods 11 and bell-crank levers 12 with a locking-pin 13. This locking-pin is adapted to engage a vertical keyway 14, formed in the column B', which will lock the collar L and its arms in the proper position as they are rotated. In these figures the mechanism for raising and lowering the plunger and for raising and lowering the collar L is the same as that shown and described in Figs. 1, 2, and 3. It will be noted that the blow-mold support 6 is constructed here of preferably a triangular form, though, if desired, this may be varied. At the blow-point this support is provided with stops 15, which serve to place the blow-molds at the proper point upon the said table or support C for receiving the pressed blank. In operation this modification is practically the same as that illustrated in Figs. 1, 2, and 3 in that the neck-ring R', which is upon the press-mold 4, is lifted through the medium of the jaws Q, removing from the press-mold the pressed blank and carrying it by the revolution of the ring or collar L to the blow-point and when lowered through the lowering of the plunger for pressing the next blank deposit the pressed blank in the blow-mold. The arms Q release the neck-ring at the blow-point the same as described in relation to Figs. 1, 2, and 3, and the mold in which the blank is blown is carried to the discharging-point and removed by the turning-out boy. The neck-ring is then placed upon the arms Q at the fixing-point of Fig. 5 for carrying the ring around to again coöperate with the press-mold in its turn. In this instance, however, the blow-head 16 is automatically deposited upon the blow-mold by the downward movement of the plunger-rod and the ring L, which carries the arm that in turn supports the neck-ring. This is accomplished through the medium of an arm 17, connected with a ring 18, just above the ring L, which, if desired, may be connected thereto. Pivotally connected to the end of this arm 17 is a link 18', having its opposite end connected to a lever 19 at a point intermediate its ends. The inner end of this lever 19 is pivotally supported by the column B' and its opposite end is connected with the blow-head rod or tube 20 through the medium of a link 21. The blow-head rod passes through and is supported through the medium of an L-shaped bracket 22, which has its inner end bolted or otherwise attached to the column B. It will be thus understood that when the ring L is moved upward by the upward movement of the plunger the blow-head 16 is likewise moved, and when the ring L moves downward with the downward movement of the plunger for pressing the glass in the press-mold the blow-head is correspondingly moved downward and deposited upon the blow-mold, automatically admitting and cutting off air in its movements, as described in my patent before referred to.

As before stated, the mechanism shown in Fig. 4 for automatically depositing the blow-head upon the blow-mold may be used in connection with the construction shown in Figs.

1, 2, and 3 in the place of the treadle $k$ and that otherwise the operation of this modification is practically the same as the operation of the construction shown in Figs. 1 and 2, whereby the pressed blank is elevated or removed from the press-mold, carried laterally, and deposited in the blow-mold, the modification differing only in some details of construction.

Having thus described my invention, what I claim, and desire to secure by Letters Patent, is—

1. A separate press-mold, a separate blow-mold, and a vertically-movable and rotatable blank-support, the said support adapted to remove the pressed blank from the press-mold and deposit it within the blow-mold, substantially as described.

2. Separate blow and press molds, a neck-ring adapted to coöperate with both of said molds, and a laterally-moving neck-ring support constructed to carry the pressed blank from the press-mold to the blow-mold and to disengage the said neck-ring by a lateral movement in respect thereto when the neck-ring is seated on the blow-mold, substantially as described.

3. A machine for the manufacture of glassware comprising a press-mold, a blow-mold, a vertically-movable blank-support, a vertically-movable plunger for coöperating with the press-mold, the blank-support supported and elevated by the plunger, substantially as described.

4. A machine for the manufacture of glassware comprising a press-mold, a blow-mold, a vertically-movable plunger, and a blank-support carried by the plunger and laterally movable in respect thereto, substantially as described.

5. A machine for the manufacture of glassware comprising a press-mold, and a blow-mold at a point removed from the press-mold, a vertically and laterally movable neck-ring support, a neck-ring adapted to coöperate with the press and blow molds, and means for disengaging the ring-support from the ring at the blow-mold, substantially as described.

6. A machine for the manufacture of glassware comprising a press-mold, a blow-mold at a point removed therefrom, a vertically and laterally movable member, a neck-ring adapted to coöperate with the press and the blow molds, and neck-ring jaws carried by the vertically and laterally movable member, and means for engaging the jaws with the neck-ring at the pressing-mold, and means for disengaging the jaws from the neck-ring at the blow-mold, substantially as described.

7. A machine for the manufacture of glassware comprising a press-mold, a blow-mold, a vertically and laterally movable member, a vertically-movable plunger, the plunger and vertically and laterally movable member being operatively connected, the said vertically and laterally movable member carrying movable neck-ring-supporting jaws, a neck-ring adapted to coöperate with the press and blow molds, and means for engaging and disengaging the said jaws from the neck-ring at the press and blow molds respectively through the movements of the vertically and laterally movable member, substantially as described.

8. A machine for the manufacture of glassware comprising a press-mold, a blow-mold, a neck-ring adapted to coöperate with said molds, a vertically and laterally movable member, movable jaws carried by the said member, means for normally holding the jaws closed, and means for opening the jaws through the movements of the member when at the blowing-mold, substantially as described.

9. In a machine for the manufacture of glassware, a press-mold carrier, a press-mold carried thereby, a blow-mold carrier, a blow-mold carried thereby, a blank-carrier adapted to coöperate with the said molds, and a supporting member for the blank-carrier vertically movable in respect to the press-mold carrier, and carried by the said press-mold carrier, and means constructed and arranged to raise the blank-carrier at the pressing-point and lower it at the blowing-point, substantially as described.

10. A machine for the manufacture of glassware, comprising a press-mold, a blow-mold, a vertically-movable blank-carrier, a vertically-movable blow-head, and an operating connection between the blank-carrier and the blow-head, whereby the downward movement of the blank-carrier seats the blow-head upon the blow-mold, substantially as described.

11. A machine for the manufacture of glassware comprising a press-mold, a blow-mold, a vertically-movable blank-carrier, a vertically-movable blow-head, a lever connected with the blow-head, and a link connected to the blank-carrier and the said lever, whereby the vertical movement of the blank-carrier operates the blow-head substantially as and for the purpose described.

12. A machine for the manufacture of glassware comprising a press-mold carrier, a plurality of press-molds carried thereby, a blow-mold, a plurality of blow-molds carried thereby, a plurality of independent neck-rings adapted to coöperate with the blow and press molds, a vertically-movable neck-ring carrier carried by the press-mold carrier, and means constructed and arranged to lift the neck-ring carrier from the press-mold move it over the blow-mold and to deposit it upon the blow-mold, substantially as described.

In testimony whereof I have hereunto set my hand in the presence of two subscribing witnesses.

CHARLES EDWIN BLUE.

Witnesses:
W. B. JONES,
A. G. HUBBARD.